US012572998B2

(12) United States Patent
Liang et al.

(10) Patent No.: US 12,572,998 B2
(45) Date of Patent: Mar. 10, 2026

(54) IMAGE SIZE ADJUSTMENT STRUCTURE, ADJUSTMENT METHOD, AND IMAGE SCALING METHOD AND DEVICE BASED ON STREAMING ARCHITECTURE

(71) Applicant: Shenzhen Corerain Technologies Co., Ltd., Guangdong (CN)

(72) Inventors: Jiantian Liang, Guangdong (CN); Kuen Hung Tsoi, Guangdong (CN); Xinyu Niu, Guangdong (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 393 days.

(21) Appl. No.: 18/301,985

(22) Filed: Apr. 17, 2023

(65) Prior Publication Data

US 2023/0252600 A1     Aug. 10, 2023

Related U.S. Application Data

(63) Continuation-in-part of application No. PCT/CN2023/070762, filed on Jan. 5, 2023.

(30) Foreign Application Priority Data

Jan. 6, 2022     (CN) .......................... 202210007701.2
Jan. 19, 2022     (CN) .......................... 202210057376.0

(51) Int. Cl.
*G06T 3/4007* (2024.01)

(52) U.S. Cl.
CPC .................................. *G06T 3/4007* (2013.01)

(58) Field of Classification Search
CPC .............................. G06T 3/4007; G06T 3/40
See application file for complete search history.

(56) References Cited

U.S. PATENT DOCUMENTS

2010/0201869 A1* 8/2010 Shin ..................... H04N 7/0135
                                                         348/448
2015/0086136 A1* 3/2015 Mizuno ................. G06T 3/4007
                                                         382/298

FOREIGN PATENT DOCUMENTS

CN      102186044 A     9/2011
CN      108986033 A     12/2018
CN      110223232 A     9/2019

* cited by examiner

*Primary Examiner* — John R Wallace

(57) ABSTRACT

The present application discloses an image size adjustment structure, an adjustment method, and an image scaling method and device based on a streaming architecture. The image size adjustment structure includes: a first multiplication operation unit, a second multiplication operation unit, a first data registering unit, a second data registering unit, a first addition operation unit and a second addition operation unit, and the input and output ports of each unit are connected according to the specified data flowing direction. It realizes the fast calculation of image data and relieves the calculation pressure of CPU.

16 Claims, 5 Drawing Sheets

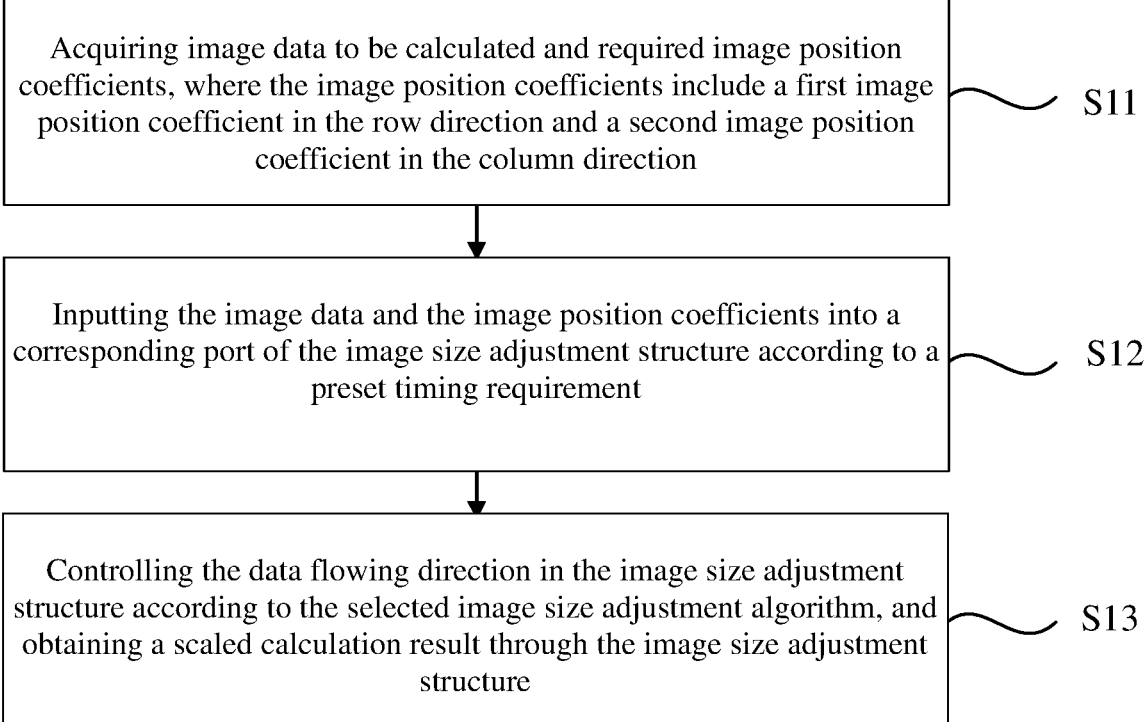

Acquiring image data to be calculated and required image position coefficients, where the image position coefficients include a first image position coefficient in the row direction and a second image position coefficient in the column direction — S11

Inputting the image data and the image position coefficients into a corresponding port of the image size adjustment structure according to a preset timing requirement — S12

Controlling the data flowing direction in the image size adjustment structure according to the selected image size adjustment algorithm, and obtaining a scaled calculation result through the image size adjustment structure — S13

FIG. 3

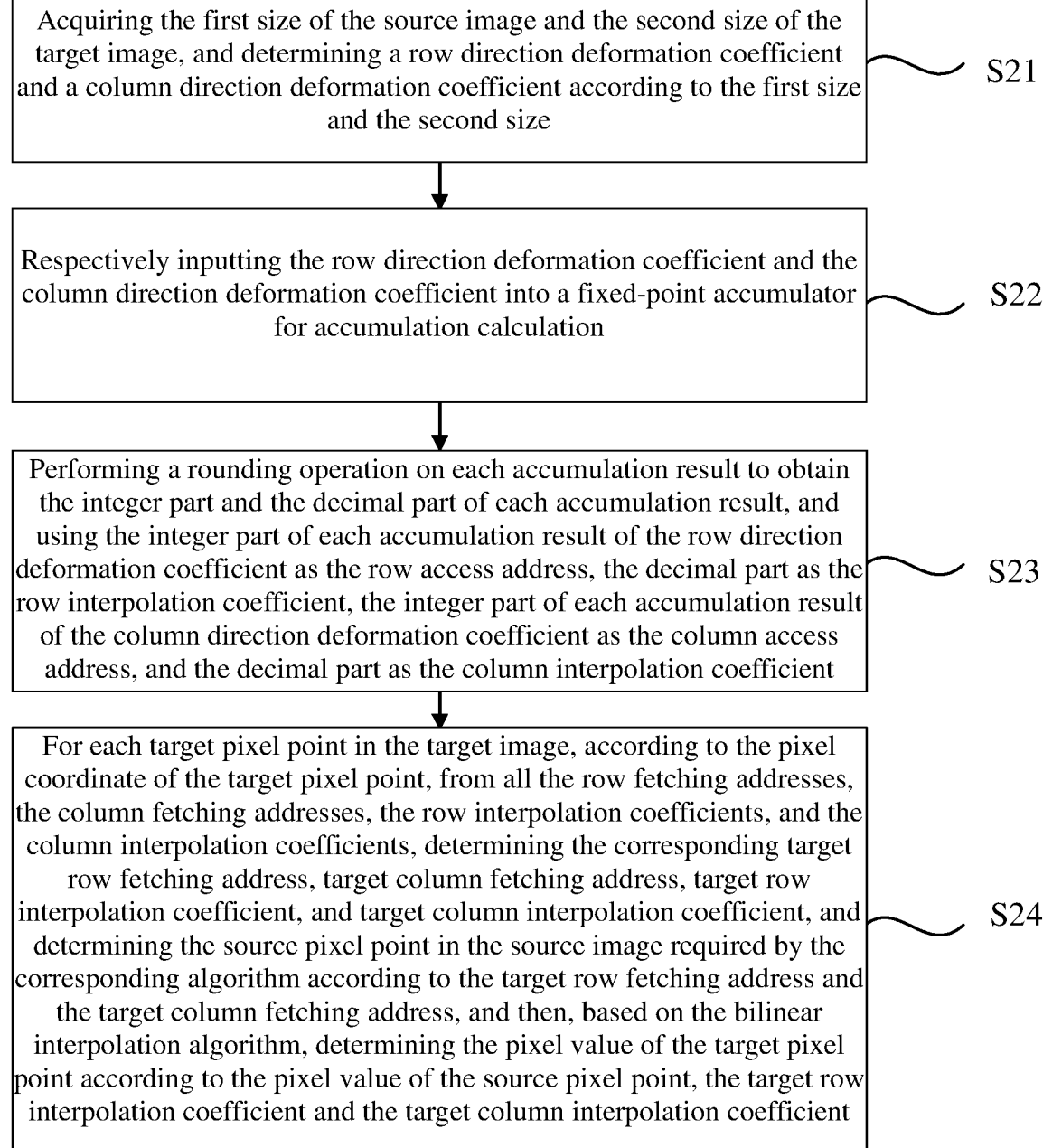

Acquiring the first size of the source image and the second size of the target image, and determining a row direction deformation coefficient and a column direction deformation coefficient according to the first size and the second size ～ S21

Respectively inputting the row direction deformation coefficient and the column direction deformation coefficient into a fixed-point accumulator for accumulation calculation ～ S22

Performing a rounding operation on each accumulation result to obtain the integer part and the decimal part of each accumulation result, and using the integer part of each accumulation result of the row direction deformation coefficient as the row access address, the decimal part as the row interpolation coefficient, the integer part of each accumulation result of the column direction deformation coefficient as the column access address, and the decimal part as the column interpolation coefficient ～ S23

For each target pixel point in the target image, according to the pixel coordinate of the target pixel point, from all the row fetching addresses, the column fetching addresses, the row interpolation coefficients, and the column interpolation coefficients, determining the corresponding target row fetching address, target column fetching address, target row interpolation coefficient, and target column interpolation coefficient, and determining the source pixel point in the source image required by the corresponding algorithm according to the target row fetching address and the target column fetching address, and then, based on the bilinear interpolation algorithm, determining the pixel value of the target pixel point according to the pixel value of the source pixel point, the target row interpolation coefficient and the target column interpolation coefficient ～ S24

| Deformation coefficient determination module | Accumulation calculation module | Interpolation parameter determination module | Target pixel determination module |

IMAGE SIZE ADJUSTMENT STRUCTURE, ADJUSTMENT METHOD, AND IMAGE SCALING METHOD AND DEVICE BASED ON STREAMING ARCHITECTURE

CROSS REFERENCE TO RELATED APPLICATIONS

The present application is a Continuation-In-Part application of PCT Application No. PCT/CN2023/070762 filed on Jan. 5, 2023, which claims the benefit of Chinese Patent Application Nos. 202210007701.2 filed on Jan. 6, 2022 and 202210057376.0 filed on Jan. 19, 2022. All the above are hereby incorporated by reference in their entirety.

TECHNICAL FIELD

Embodiments of the present application relate to the technical field of data processing, and in particular to an image size adjustment structure, adjustment method, and image scaling method and device based on a streaming architecture.

BACKGROUND

With the rapid development of deep learning, convolutional neural networks have been widely used in machine vision applications, such as image recognition and image classification. Artificial intelligence chips based on streaming architecture are being applied in more and more scenarios due to their extremely high chip utilization. In order to improve the end-to-end efficiency of the streaming architecture AI chip, it is necessary to perform front-end and back-end calculation processing on video and image flow-related data, such as enlarging or reducing (resize) the image to a size that matches the subsequent modules.

In the traditional calculation architecture, it is necessary to use the CPU to resize the image based on the instruction set. Due to the large amount of resize calculation data, it will occupy more CPU resources, thereby reducing the end-to-end performance of the entire AI system and consuming more calculation time cost, and affecting the overall calculation efficiency.

SUMMARY

Embodiments of the present application provide an image size adjustment structure, adjustment method, and image scaling method and device based on a streaming architecture, so as to relieve the calculation pressure of the CPU and realize extremely high-efficiency calculations.

In a first aspect, an embodiment of the present application provides an image size adjustment structure based on a streaming architecture, including:

a first multiplication operation unit, a second multiplication operation unit, a first data registering unit, a second data registering unit, a first addition operation unit and a second addition operation unit;

wherein, a first input end of the first multiplication operation unit is used to receive image data to be calculated, a second input end of the first multiplication operation unit is used to receive a first image position coefficient, and an output end of the first multiplication operation unit is respectively connected to an input end of the first data registering unit and a third input end of the first addition operation unit, an output end of the first data registering unit is connected to a fourth input end of the first addition operation unit, an output end of the first addition operation unit is connected to a fifth input end of the second multiplication operation unit, a sixth input end of the second multiplication operation unit is used to receive a second image position coefficient, and an output end of the second multiplication operation unit is respectively connected to an input end of the second data registering unit and a seventh input end of the second addition operation unit, an output end of the second data registering unit is connected to an eighth input end of the second addition operation unit, an output end of the second addition operation unit is used to output a calculation result of the image data;

the first data registering unit is used to store a previous operation result of the first multiplication operation unit in a serial operation, and the second data registering unit is used to store a previous operation result of the second multiplication operation unit in the serial operation.

Optionally, the structure further includes:

a first data selection unit and a first data allocation unit between the first addition operation unit and the second multiplication operation unit, a third data registering unit and a third addition operation unit between the first data selection unit and the first data allocation unit;

wherein, the output end of the first addition operation unit is connected to an input end of the first data selection unit, an output end of the first data allocation unit is connected to the input end of the second multiplication operation unit, a first output end of the first data selection unit is directly connected to a ninth input end of the first data allocation unit, a tenth input end of the first data allocation unit is connected to an output end of the third addition operation unit, a second output end of the first data selection unit is respectively connected to an input end of the third data registering unit and an eleventh input end of the third addition operation unit, an output of the third data registering unit is connected to a twelfth input end of the third addition operation unit;

after the second addition operation unit, the structure further includes a second data selection unit and a second data allocation unit, and between the second data selection unit and the second data allocation unit, the structure further includes a fourth data registering unit and a fourth addition operation unit;

wherein, the output end of the second addition operation unit is connected to an input end of the second data selection unit, an output end of the second data allocation unit is used to output the calculation result of the image data, a third output end of the second data selection unit is directly connected to a thirteenth input end of the second data allocation unit, a fourteenth input end of the second data allocation unit is connected to an output end of the fourth addition operation unit, a fourth output end of the second data selection unit is respectively connected to an input end of the fourth data registering unit and a fifteenth input end of the fourth addition operation unit, and an output end of the fourth data registering unit is connected to a sixteenth input end of the fourth addition operation unit.

Optionally, if the first data selection unit and the first data allocation unit select to use a data flowing direction from the first output end to the ninth input end, and the second data selection unit and the second data allocation unit select to use a data flowing direction from the third output end to the thirteenth input end, the image size adjustment structure adopts a bilinear interpolation algorithm.

Optionally, if the first data selection unit and the first data allocation unit select to use a data flowing direction from the second output end to the tenth input end, and the second data selection unit and the second data allocation unit select to use a data flowing direction from the fourth output end to the fourteenth input end, the image size adjustment structure adopts a cubic interpolation method.

In a second aspect, an embodiment of the present application provides an image size adjustment method, applied to the image size adjustment structure based on the streaming architecture according to any embodiment of the present application, including:

acquiring image data to be calculated and required image position coefficients, the image position coefficients including a first image position coefficient in a row direction and a second image position coefficient in a column direction;

inputting the image data and the image position coefficients into a corresponding port of the image size adjustment structure according to a preset timing requirement; and controlling a data flowing direction in the image size adjustment structure according to a selected image size adjustment algorithm, and obtaining a scaled calculation result through the image size adjustment structure.

Optionally, the step of controlling a data flowing direction in the image size adjustment structure according to a selected image size adjustment algorithm, and obtaining a scaled calculation result through the image size adjustment structure includes:

if the image size adjustment algorithm is a bilinear interpolation algorithm, a following formula is used for calculation:

$$D_0 = u_1 \times (v_1 \times Q_0 + v_0 \times Q_1) + u_0 \times (v_1 \times Q_2 + v_0 \times Q_3)$$

where $D_0$ represents pixel data of a target image, $v_0$ and $v_1$ represent the first image position coefficient, and $u_0$ and $u_1$ represent the second image position coefficient, and $Q_0$, $Q_1$, $Q_2$ and $Q_3$ represent 4 pixel data in a source image.

Optionally, the step of controlling a data flowing direction in the image size adjustment structure according to a selected image size adjustment algorithm, and obtaining a scaled calculation result through the image size adjustment structure includes:

if the image size adjustment algorithm is a cubic interpolation method, a following formula is used for calculation:

$$\begin{aligned}D_0 = &u_0 \times (v_0 \times Q_0 + v_1 \times Q_1 + v_2 \times Q_2 + v_3 \times Q_3) + u_1 \times (v_0 \times Q_4 + \\ &v_1 \times Q_5 + v_2 \times Q_6 + v_3 \times Q_7) + u_2 \times (v_0 \times Q_8 + v_1 \times Q_9 + v_2 \times \\ &Q_{10} + v_3 \times Q_{11}) + u_3 \times (v_0 \times Q_{12} + v_1 \times Q_{13} + v_2 \times Q_{14} + v_3 \times \\ &Q_{15})\end{aligned}$$

where $D_0$ represents pixel data of a target image, $v_0$, $v_1$, $v_2$ and $v_3$ represent the first image position coefficient, $u_0$, $u_1$, $u_2$ and $u_3$ represent the second image position coefficient, and $Q_0$, $Q_1$, $Q_2$, $Q_3$, $Q_4$, $Q_5$, $Q_6$, $Q_7$, $Q_8$, $Q_9$ $Q_{10}$, $Q_{11}$, $Q_{12}$, $Q_{13}$, $Q_{14}$ and $Q_{15}$ represent 16 pixel data in a source image.

Optionally, acquiring the required image position coefficients includes:

calculating the image position coefficients according to a preset image scaling ratio and the image size adjustment algorithm through a pre-stage module.

In a third aspect, an embodiment of the present application provides an image scaling method based on a bilinear interpolation algorithm, applied to the image size adjustment method, including:

acquiring a first size of a source image and a second size of a target image, and determining a row direction deformation coefficient and a column direction deformation coefficient according to the first size and the second size;

respectively inputting the row direction deformation coefficient and the column direction deformation coefficient into a fixed-point accumulator for accumulation calculation;

respectively performing a rounding operation on each accumulation result to obtain an integer part and a decimal part of each accumulation result, and using the integer part of each accumulation result of the row direction deformation coefficient as a row access address, and the decimal part of each accumulation result of the row direction deformation coefficient as a row interpolation coefficient, using the integer part of each accumulation result of the column direction deformation coefficient as a column access address, and the decimal part of each accumulation result of the column direction deformation coefficient as a column interpolation coefficient; and for each target pixel point in the target image, according to a pixel coordinate of the target pixel point, from all row access addresses, all column access addresses, all row interpolation coefficients, and all column interpolation coefficients, determining a corresponding target row access address, a corresponding target column access address, a corresponding target row interpolation coefficient, and a corresponding target column interpolation coefficient, and determining a source pixel point in the source image required by a corresponding algorithm according to the target row access address and the target column access address; and then based on the bilinear interpolation algorithm, determining a pixel value of the target pixel point according to a pixel value of the source pixel point, the target row interpolation coefficient and the target column interpolation coefficient.

Optionally, before the step of according to a pixel coordinate of the target pixel point, from all row access addresses, all column access addresses, all row interpolation coefficients, and all column interpolation coefficients, determining a corresponding target row access address, a corresponding target column access address, a corresponding target row interpolation coefficient, and a corresponding target column interpolation coefficient, and determining a source pixel point in the source image required by a corresponding algorithm according to the target row access address and the target column access address, the method further includes: storing the integer part and the decimal part of each accumulation result of the row direction deformation coefficient into a first lookup table in sequence, and storing the integer part and the decimal part of each accumulation result of the column direction deformation coefficient into a second lookup table in sequence, index values of the first lookup table and the second lookup table respectively corresponding to row coordinates and column coordinates of each target pixel point;

correspondingly, the step of according to a pixel coordinate of the target pixel point, from all row access addresses, all column access addresses, all row interpolation coefficients, and all column interpolation coefficients, determining a corresponding target row access address, a corresponding target column access address, a corresponding target row interpolation coefficient, and a corresponding target column interpolation coefficient includes:

respectively using row coordinates and column coordinates in the pixel coordinate as the index values to look up the target row access address, the target column access address, the target row interpolation coefficient and the target column interpolation coefficient from the first lookup table and the second lookup table.

Optionally, the second size includes a width size and a height size; before the step of storing the integer part and the decimal part of each accumulation result of the row direction deformation coefficient into a first lookup table in sequence, and storing the integer part and the decimal part of each accumulation result of the column direction deformation coefficient into a second lookup table in sequence, the method further includes:

allocating a lookup table space for the first lookup table and the second lookup table respectively, a width of a lookup table space of the first lookup table is 2, and a depth of the lookup table space of the first lookup table is the width size, a width of a lookup table space of the second lookup table is 2, and a depth of the lookup table space of the second lookup table is the height size.

Optionally, the rounding operation is rounding down, and the step of determining a source pixel point in the source image required by a corresponding algorithm according to the target row access address and the target column access address includes:

using the target row access address as a row coordinate, and the target column access address as a column coordinate to determine a first source pixel point;

using the target row access address as a row coordinate, adding one to the target column access address as a column coordinate to determine a second source pixel point;

using adding one to the target row access address as a row coordinate, and the target column access address as a column coordinate to determine a third source pixel point;

using adding one to the target row access address as a row coordinate, adding one to the target column access address as a column coordinate to determine a fourth source pixel.

Optionally, based on the bilinear interpolation algorithm, the step of determining a pixel value of the target pixel point according to a pixel value of the source pixel point, the target row interpolation coefficient and the target column interpolation coefficient includes:

$$P_{(X_{dst},Y_{dst})}=(1-u_{x1})(1-v_{x1})\times Q_{x11}+(1-u_{x1})\times v_{x1}\times Q_{x12}+u_{x1}\times(1-v_{x1})\times Q_{x21}+u_{x1}\times v_{x1}\times Q_{x22}$$

where $(X_{dst}, Y_{dst})$ represents the pixel coordinate of the target pixel point, $P_{(X_{dst},Y_{dst})}$ represents the pixel value of the target pixel point, $u_{x1}$ represents the target row interpolation coefficient, and $v_{x1}$ represents the target column interpolation coefficient, $Q_{x11}$ represents the pixel value of the first source pixel point, $Q_{x12}$ represents the pixel value of the second source pixel point, $Q_{x21}$ represents the pixel value of the third source pixel point, and $Q_{x22}$ represents the pixel value of the fourth source pixel point.

Optionally, the step of acquiring a first size of a source image and a second size of a target image, and determining a row direction deformation coefficient and a column direction deformation coefficient according to the first size and the second size includes:

$$\text{scale}_x = \frac{src_{rows}}{dst_{rows}} \quad \text{scale}_y = \frac{src_{cols}}{dst_{cols}}$$

where $\text{scale}_x$ represents the row direction deformation coefficient, $\text{scale}_y$ represents the column direction deformation coefficient, $src_{rows}$ represents the width size in the first size, and $dst_{rows}$ represents the width size in the second size, $src_{cols}$ represents the height size in the first size, and $dst_{cols}$ represents the height size in the second size.

Optionally, the fixed-point accumulator includes a first accumulator and a second accumulator, and the step of respectively inputting the row direction deformation coefficient and the column direction deformation coefficient into a fixed-point accumulator for accumulation calculation includes:

initializing a first input end and a second input end of the first accumulator, and a third input end and a fourth input end of the second accumulator;

an output end of the first accumulator is connected to the first input end, the row direction deformation coefficient is input through the second input end, an output end of the second accumulator is connected to the third input end, the column direction deformation coefficient is input through the fourth input end;

controlling the first accumulator to perform the accumulation calculation the first number of times, and controlling the second accumulator to perform the accumulation calculation the second number of times, wherein the first number of times is the number of pixels of the target image in the row direction, the second number of times is the number of pixels of the target image in the column direction.

In a fourth aspect, an embodiment of the present application provides an image scaling device based on a bilinear interpolation algorithm, applied to the image size adjustment method, including:

a deformation coefficient determination module, configured to acquire a first size of a source image and a second size of a target image, and determine a row direction deformation coefficient and a column direction deformation coefficient according to the first size and the second size;

an accumulation calculation module, configured to respectively input the row direction deformation coefficient and the column direction deformation coefficient into a fixed-point accumulator for accumulation calculation;

an interpolation parameter determination module, configured to respectively perform a rounding operation on each accumulation result to obtain an integer part and a decimal part of each accumulation result, and use the integer part of each accumulation result of the row direction deformation coefficient as a row access address, and the decimal part of each accumulation result of the row direction deformation coefficient as a row interpolation coefficient, and use the integer part of each accumulation result of the column direction deformation coefficient as a column access address, and the decimal part of each accumulation result of the column direction deformation coefficient as a column interpolation coefficient;

a target pixel determination module, configured to for each target pixel point in the target image, according to a pixel coordinate of the target pixel point, from all row access addresses, all column access addresses, all row interpolation coefficients, and all column interpolation coefficients, determine a corresponding target row access address, a corresponding target column access address, a corresponding target row interpolation coefficient, and a corresponding target column interpolation coefficient, and determine a source pixel point in the source image required by a corresponding algorithm according to the target row access address and the target column access address; and then based on the bilinear interpolation algorithm, determine a pixel value of the target pixel point according to a pixel value of the source pixel point, the target row interpolation coefficient and the target column interpolation coefficient.

An embodiment of the present application provides an image size adjustment structure based on a streaming architecture, including a first multiplication operation unit, a second multiplication operation unit, a first data registering unit, a second data registering unit, a first addition operation unit, and a second multiplication operation unit. The input and output ports of each unit are connected according to the set data flowing direction. By constructing a special unit for adjusting the image size in the streaming architecture, and controlling the image data to be calculated to flow through different calculation units in sequence, it avoids calling the CPU for calculation based on the instruction set, realizes the fast calculation of image data, and relieves the calculation pressure of the CPU, thereby realizing the rapid scaling processing of video and image streams, effectively slowing down the bottleneck problem of the inefficiency of front and rear processing of the AI chip.

BRIEF DESCRIPTION OF THE DRAWINGS

FIG. 3 is a flowchart of an image size adjustment method provided in Embodiment 2 of the present application;

FIG. 4 is a flowchart of an image scaling method based on a bilinear interpolation algorithm provided by Embodiment 3 of the present application;

DETAILED DESCRIPTION

Figure 1:
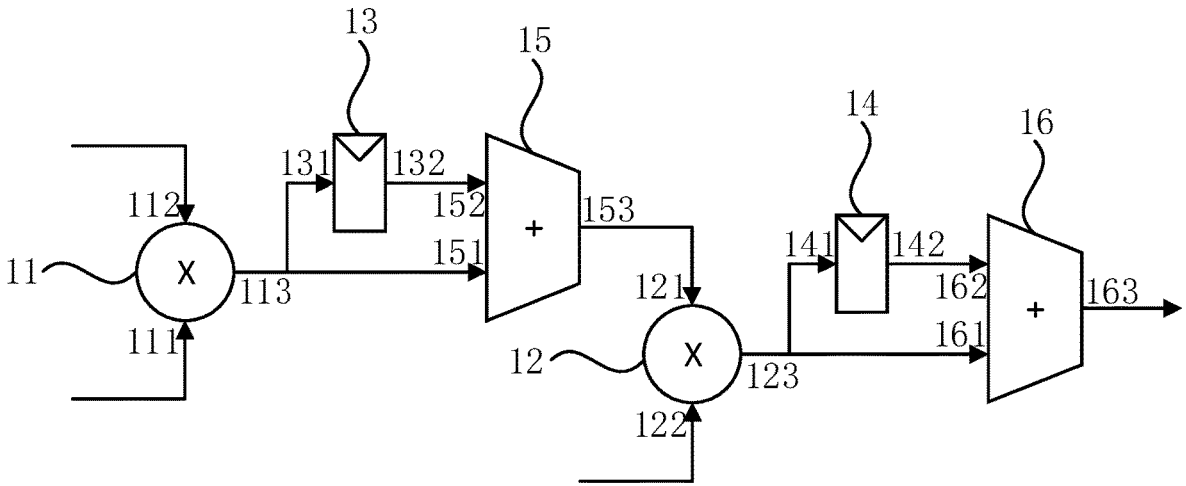
FIG. 1 is a schematic structural diagram of an image size adjustment structure based on a streaming architecture provided by Embodiment 1 of the present application.

The present application is further described in detail below with reference to accompanying drawings and embodiments. It may be understood that specific embodiments described herein are only used to explain the present application, but not to limit the present application. In addition, it should be further noted that, for ease of description, the accompanying drawings only show parts relevant to the present application rather than the entire structure.

Some exemplary embodiments are described as processing or methods depicted as in the flowchart. Although the flowchart describes the steps as sequential processing, many of them can be implemented in parallel, concurrently, or simultaneously. In addition, the order of the steps can be rearranged. The processing may be terminated when its operation is completed, but there may be also additional steps not included in the drawings. The processing can correspond to methods, functions, procedures, subroutines, subprograms, or the like.

In addition, terms "first" and "second" may be used to describe various directions, motions, steps, or elements in this disclosure, but these directions, motions, steps, or elements are not limited by the terms. The terms are only used for distinguishing one direction, motion, step, or element from another direction, motion, step, or element. For example, without departing from the scope of the present application, a first input end can be referred to as a second input end, and similarly, the second input end can be referred as the first input end. Both the first input end and the second input end are input ends, but they do not refer to the same input ends. The terms "first" and "second" should not be understood as indicating or implying relative importance or implicitly indicating the number of technical features indicated. Therefore, features defined as "first" and "second" may explicitly or implicitly include one or more such features. In the description of this disclosure, "a plurality of" means at least two, such as two and three unless it is specifically defined otherwise.

Embodiment 1

FIG. 1 is a schematic structural diagram of an image size adjustment structure based on a streaming architecture provided by Embodiment 1 of the present application. This embodiment is applicable to the case of performing front-end and back-end calculation processing on video and image stream-related data. As shown in FIG. 1, the image size adjustment structure includes: a first multiplication operation unit 11, a second multiplication operation unit 12, a first data registering unit 13, a second data registering unit 14, a first addition operation unit 15 and a second addition operation unit 16. The first input end 111 of the first multiplication operation unit 11 is used to receive the image data to be calculated, the second input end 112 is used to receive the first image position coefficient, and the output end 113 of the first multiplication operation unit 11 is respectively connected to the input end 131 of the first data registering unit 13 and the third input end 151 of the first addition operation unit 15. The output end 132 of the first data registering unit 13 is connected to the fourth input end 152 of the first addition operation unit 15, and the output end 153 of the first addition operation unit 15 is connected to the fifth input end 121 of the second multiplication operation unit 12. The sixth input end 122 of the second multiplication operation unit 12 is used to receive the second image position coefficient, and the output end 123 of the second multiplication operation unit 12 is respectively connected to the input end 141 of the second data registering unit 14 and the seventh input end 161 of the second addition operation unit 16. The output end 142 of the second data registering unit 14 is connected to the eighth input end 162 of the second addition operation unit 16, and the output end 163 of the second addition operation unit 16 is used to output the calculation result of the image data. The first data registering unit 13 is used to store the previous calculation result of the first multiplication operation unit 11 in the serial operation, and the second data registering unit 14 is used to store the previous operation result of the second multiplication operation unit 12 in the serial operation.

Specifically, the image data to be calculated, the first image position coefficient and the second image position coefficient can be input from the first input end 111, the second input end 112 of the first multiplication operation unit 11, and the sixth input end 122 of the second multiplication operation unit 12 in this structure according to the agreed timing requirements. Then the structure can use a bilinear interpolation algorithm to perform calculation on the input image data to obtain a scaled calculation result. Prior to this, the first image position coefficient and the second image position coefficient corresponding to the row and column directions may be calculated in advance by the pre-stage module according to the preset image scaling ratio. The bilinear interpolation algorithm can be calculated using the following formula:

$$D_0 = u_1 \times (v_1 \times Q_0 + v_0 \times Q_1) + u_0 \times (v_1 \times Q_2 + v_0 \times Q_3)$$

where $D_0$ represents the calculation result, i.e., the pixel data of the target image, $v_0$ and $v_1$ represent the first image position coefficients, and $u_0$ and $u_1$ represent the second image position coefficients, and $Q_0$, $Q_1$, $Q_2$ and $Q_3$ represent the corresponding desired 4 pixel data in the source image. Then, $v_1 \times Q_0$, $v_0 \times Q_1$, $v_1 \times Q_2$ and $v_0 \times Q_3$ are respectively calculated through first multiplication operation unit 11. Then, $v_1 \times Q_0 + v_0 \times Q_1$ and $v_1 \times Q_2 + v_0 \times Q_3$ are obtained through the calculation of the first addition operation unit 15. Then, $u_1 \times (v_1 \times Q_0 + v_0 \times Q_1)$ and $u_0 \times (v_1 \times Q_2 + v_0 \times Q_3)$ are obtained through the calculation of the second multiplication operation unit 12. Finally, $D_0$ is obtained through the calculation of the second addition operation unit 16 and is output. The addition operation can be realized by respectively storing the previous operation result of the previous unit through the first data registering unit 13 and the second data registering unit 14. Then, by controlling the image data to be calculated to enter and flow through each calculation unit in sequence, the calculation of the entire image can be completed.

Figure 2:
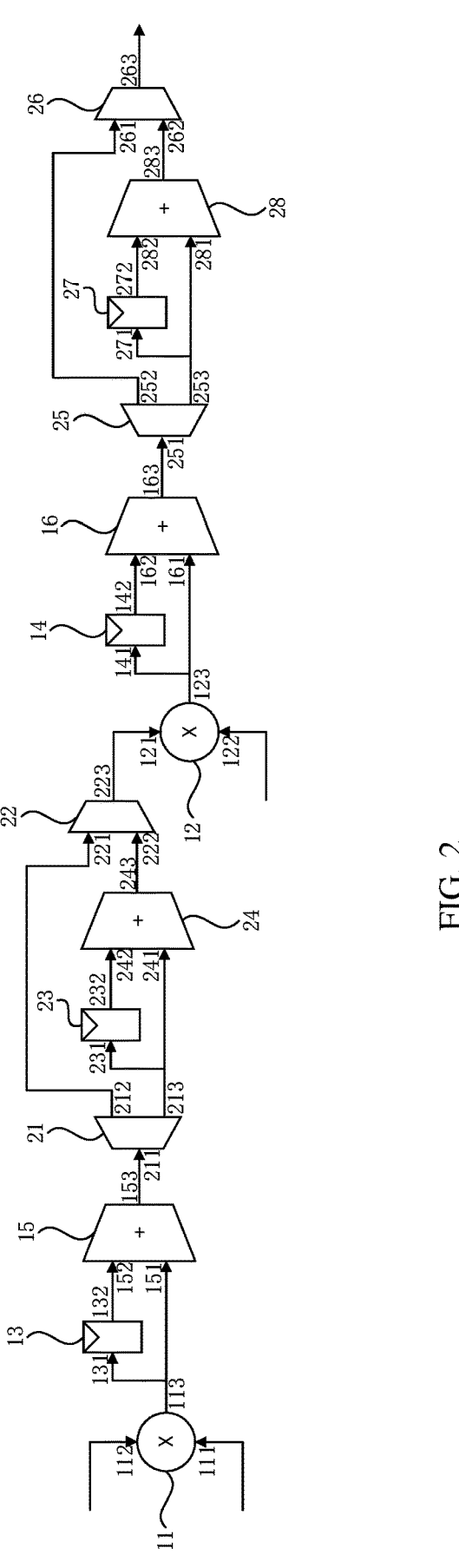
FIG. 2 is a schematic structural diagram of another image size adjustment structure based on a streaming architecture provided by Embodiment 1 of the present application.

On the basis of the above technical solution, optionally, as shown in FIG. 2, between the first addition operation unit 15 and the second multiplication operation unit 12, a first data selection unit 21 and a first data allocation unit 22 are further included. Between the first data selection unit 21 and the first data allocation unit 22, a third data registering unit 23 and a third addition operation unit 24 are further included. The output end 153 of the first addition operation unit 15 is connected to the input end 211 of the first data selection unit 21. The output end 223 of the first data allocation unit 22 is connected to the input end 121 of the second multiplication operation unit 12. The first output end 212 of the first data selection unit 21 is directly connected to the ninth input end 221 of the first data allocation unit 22. The tenth input end 222 of the first data allocation unit 22 is connected to the output end 243 of the third addition operation unit 24. The second output end 213 of the first data selection unit 21 is respectively connected to the input end 231 of the third data registering unit 23 and the eleventh input end 241 of the third addition operation unit 24. The output end 232 of the third data registering unit 23 is connected to the twelfth input end 242 of the third addition operation unit 24. After the second addition operation unit 16, a second data selection unit 25 and a second data allocation unit 26 are further included. Between the second data selection unit 25 and the second data allocation unit 26, a fourth data registering unit 27 and a fourth addition operation unit 28 are further included. The output end 163 of the second addition operation unit 16 is connected to the input end 251 of the second data selection unit 25. The output end 263 of the second data allocation unit 26 is used to output the calculation result of the image data. The third output end 252 of the second data selection unit 25 is directly connected to the thirteenth input end 261 of the second data allocation unit 26. The fourteenth input end 262 of the second data allocation unit 26 is connected to the output end 283 of the fourth addition operation unit 28. The fourth output end 253 of the second data selection unit 25 is respectively connected to the input end 271 of the fourth data registering unit 27 and the fifteenth input end 281 of the fourth addition operation unit 28. The output end 272 of the fourth data registering unit 27 is connected to the sixteenth input end 282 of the fourth addition operation unit 28.

Further optionally, if the first data selection unit 21 and the first data allocation unit 22 select to use the data flowing direction from the first output end 212 to the ninth input end 221, and the second data selection unit 25 and the second data allocation unit 26 select to use the data flowing direction from the third output end 252 to the thirteenth input end 261, then the image size adjustment structure adopts a bilinear interpolation algorithm. And, optionally, if the first data selection unit 21 and the first data allocation unit 22 select to use the data flowing direction from the second output end 213 to the tenth input end 222, and the second data selection unit 25 and the second data allocation unit 26 select to use the data flowing direction from the fourth output end 253 to the fourteenth input end 262, then the image size adjustment structure adopts a cubic interpolation method.

Specifically, a group of data selection units and data allocation units can cooperate to perform bypass processing, so that the image size adjustment structure provided by this embodiment can select to use a bilinear interpolation algorithm or a cubic interpolation method to perform calculations on the input image data to obtain corresponding scaled calculation results. When the first data selection unit 21 and the first data allocation unit 22 select to use the data flowing direction from the first output end 212 to the ninth input end 221, and the second data selection unit 25 and the second data allocation unit 26 select to use the data flowing direction from the third output end 252 to the thirteenth input end 261, this structure can use a bilinear interpolation algorithm to perform calculation on the input image data. The specific calculation process is as described above and will not be repeated here. When the first data selection unit 21 and the first data allocation unit 22 select to use the data flowing direction from the second output end 213 to the tenth input end 222, and the second data selection unit 25 and the second data allocation unit 26 select to use the data flowing direction from the fourth output end 253 to the fourteenth input end 262, the structure can use the cubic interpolation method to perform calculation on the input image data. Specifically, the following formula can be used:

$$
\begin{aligned}
D_0 = {} & u_0 \times (v_0 \times Q_0 + v_1 \times Q_1 + v_2 \times Q_2 + v_3 \times Q_3) + u_1 \times (v_0 \times Q_4 + \\
& v_1 \times Q_5 + v_2 \times Q_6 + v_3 \times Q_7) + u_2 \times (v_0 \times Q_8 + v_1 \times Q_9 + v_2 \times \\
& Q_{10} + v_3 \times Q_{11}) + u_3 \times (v_0 \times Q_{12} + v_1 \times Q_{13} + v_2 \times Q_{14} + v_3 \times \\
& Q_{15})
\end{aligned}
$$

where $D_0$ represents the calculation result, i.e., the pixel data of the target image, $v_0$, $v_1$, $v_2$ and $v_3$ represent the first image position coefficients, $u_0$, $u_1$, $u_2$ and $u_3$ represent the second image position coefficients, and $Q_0$, $Q_1$, $Q_2$, $Q_3$, $Q_4$, $Q_5$, $Q_6$, $Q_7$, $Q_8$, $Q_9$ $Q_{10}$, $Q_{11}$, $Q_{12}$, $Q_{13}$, $Q_{14}$ and $Q_{15}$ represent the corresponding desired 16 pixel data in the source image. Then, $v_0 \times Q_0$, $v_1 \times Q_1$, $v_2 \times Q_2$, $v_3 \times Q_3$, $v_0 \times Q_4$, $v_1 \times Q_5$, $v_2 \times Q_6$, $v_3 \times Q_7$, $v_0 \times Q_8$, $v_1 \times Q_9$, $v_2 \times Q_{10}$, $v_3 \times Q_{11}$, $v_0 \times Q_{12}$, $v_1 \times Q_{13}$, $v_2 \times Q_{14}$ and $v_3 \times Q_{15}$ are calculated serially by the first multiplication operation unit 11. Then, the adjacent products thereof, are added serially in pairs by the first addition operation unit 15 to obtain $v_0 \times Q_0 + v_1 \times Q_1$, $v_2 \times Q_2 + v_3 \times Q_3$, $v_0 \times Q_4 + v_1 \times Q_5$, $v_2 \times Q_6 + v_3 \times Q_7$, $v_0 \times Q_8 + v_1 \times Q_9$, $v_2 \times Q_{10} + v_3 \times Q_{11}$, $v_0 \times Q_{12} + v_1 \times Q_{13}$ and $v_2 \times Q_{14} + v_3 \times Q_{15}$. Then, the adjacent sums thereof, are added serially in pairs by the third addition operation unit 24 to obtain $v_0 \times Q_0 + v_1 \times Q_1 + v_2 \times Q_2 + v_3 \times Q_3$, $v_0 \times Q_4 + v_1 \times Q_5 + v_2 \times Q_6 + v_3 \times Q_7$, $v_0 \times Q_8 + v_1 \times Q_9 + v_2 \times Q_{10} + v_3 \times Q_{11}$ and $v_0 \times Q_{12} + v_1 \times Q_{13} + v_2 \times Q_{14} + v_3 \times Q_{15}$. Then, through the second multiplication operation unit 12, each obtained sum is serially multiplied by $u_0$, $u_1$, $u_2$ and $u_3$ respectively to obtain $u_0 \times (v_0 \times Q_0 + v_1 \times Q_1 + v_2 \times Q_2 + v_3 \times Q_3)$, $u_1 \times (v_0 \times Q_4 + v_1 \times Q_5 + v_2 \times Q_6 + v_3 \times Q_7)$, $u_2 \times (v_0 \times Q_8 + v_1 \times Q_9 + v_2 \times Q_{10} + v_3 \times Q_{11})$ and $u_3 \times (v_0 \times Q_{12} + v_1 \times Q_{13} + v_2 \times Q_{14} + v_3 \times Q_{15})$. Then, through the second addition operation unit 16, the adjacent products are serially added in pairs to obtain $u_0 \times (v_0 \times Q_0 + v_1 \times Q_1 + v_2 \times Q_2 + v_3 \times Q_3) + u_1 \times (v_0 \times Q_4 + v_1 \times Q_5 + v_2 \times Q_6 + v_3 \times Q_7)$ and $u_2 \times (v_0 \times Q_8 + v_1 \times Q_9 + v_2 \times Q_{10} + v_3 \times Q_{11}) + u_3 \times (v_0 \times Q_{12} + v_1 \times Q_{13} + v_2 \times Q_{14} + v_3 \times Q_{15})$ Finally, through the calculation of the fourth addition operation unit 28, $D_0$ is obtained and output. The addition operation can be realized by respectively storing the previous operation results of the previous units through the first data registering unit 13, the second data registering unit 14, the third data registering unit 23 and the fourth data registering unit 27. The third data registering unit 23 can be used in the serial calculation to store the previous operation result of the first addition operation unit 15, and the fourth data registering unit 27 can be used in the serial calculation to store the previous operation result of the second addition operation unit 16. Then, by controlling the image data to be calculated to enter and flow through each calculation unit in sequence, the calculation of the entire image can be completed.

The image size adjustment structure based on the streaming architecture provided by the embodiment of the present application includes a first multiplication operation unit, a second multiplication operation unit, a first data registering unit, a second data registering unit, a first addition operation unit and a second addition operation unit. The input and output ports of each unit are connected according to the set data flowing direction. By constructing a special unit for adjusting the image size in the streaming architecture, and controlling the image data to be calculated to flow through different calculation units in sequence, It avoids calling CPU for calculation based on the instruction set, realizes the fast calculation of image data, and relieves the calculation pressure of the CPU, thereby realizing the rapid scaling processing of video and image streams, and effectively slowing down the bottleneck problem of the inefficiency of the front and rear processing of the AI chip.

Embodiment 2

FIG. 3 is a flowchart of an image size adjustment method provided by Embodiment 2 of the present application. This embodiment is applicable to the case of performing front-end and back-end calculation processing on video and image stream-related data. This method can be applied to the image size adjustment structure based on the streaming architecture provided by any embodiment of the present application, and has a corresponding method process and beneficial result for this structure. As shown in FIG. 3, it specifically includes the following steps:

S11. acquiring image data to be calculated and required image position coefficients, where the image position coefficients include a first image position coefficient in the row direction and a second image position coefficient in the column direction;

S12. inputting the image data and the image position coefficient into a corresponding port of the image size adjustment structure according to a preset timing requirement; and S13. controlling the data flowing direction in the image size adjustment structure according to the selected image size adjustment algorithm, and obtaining a scaled calculation result through the image size adjustment structure.

Optionally, the step of controlling the data flowing direction in the image size adjustment structure according to the selected image size adjustment algorithm, and obtaining a scaled calculation result through the image size adjustment structure, includes:

if the image size adjustment algorithm is a bilinear interpolation algorithm, the following formula is used for calculation:

$$D_0 = u_1 \times (v_1 \times Q_0 + v_0 \times Q_1) + u_0 \times (v_1 \times Q_2 + v_0 \times Q_3)$$

where $D_0$ represents the pixel data of the target image, $v_0$ and $v_1$ represent the first image position coefficients, and $u_0$ and $u_1$ represent the second image position coefficients, and $Q_0$, $Q_1$, $Q_2$ and $Q_3$ represent 4 pixel data in the source image.

And, optionally, the step of controlling the data flowing direction in the image size adjustment structure according to the selected image size adjustment algorithm, and obtaining a scaled calculation result through the image size adjustment structure, includes:

if the image size adjustment algorithm is a cubic interpolation method, the following formula is used for calculation:

$$D_0 = u_0 \times (v_0 \times Q_0 + v_1 \times Q_1 + v_2 \times Q_2 + v_3 \times Q_3) + u_1 \times (v_0 \times Q_4 + v_1 \times Q_5 + v_2 \times Q_6 + v_3 \times Q_7) + u_2 \times (v_0 \times Q_8 + v_1 \times Q_9 + v_2 \times Q_{10} + v_3 \times Q_{11}) + u_3 \times (v_0 \times Q_{12} + v_1 \times Q_{13} + v_2 \times Q_{14} + v_3 \times Q_{15})$$

where $D_0$ represents the pixel data of the target image, $v_0$, $v_1$, $v_2$ and $v_3$ represent the first image position coefficients, $u_0$, $u_1$, $u_2$ and $u_3$ represent the second image position coefficients, and $Q_0$, $Q_1$, $Q_2$, $Q_3$, $Q_4$, $Q_5$, $Q_6$, $Q_7$, $Q_8$, $Q_9$ $Q_{10}$, $Q_{11}$, $Q_{12}$, $Q_{13}$, $Q_{14}$ and $Q_{15}$ represent 16 pixel data in the source image.

Optionally, acquiring the required image position coefficient includes:

through the pre-stage module, calculating the image position coefficients according to the preset image scaling ratio and the image size adjustment algorithm.

Specifically, when it is necessary to perform front-end and back-end calculation processing on video and image stream-related data, the required image position coefficient can be calculated according to the preset image scaling ratio and the selected image size adjustment algorithm through the pre-stage module of this structure. Then, the required image position coefficient and the acquired image data that needs to be adjusted can be input to the corresponding port of the image size adjustment structure based on the agreed timing requirements. As mentioned above, the image data can be input to the first input end of the first multiplication operation unit in the structure. The first image position coefficient and the second image position coefficient can be input to the second input end of the first multiplication operation unit and the sixth input end of the second multiplication operation unit in the structure respectively. Then, according to the selected image size adjustment algorithm, the data flowing direction is controlled in the structure, and specifically is realized by controlling the input and output ports enabled by the first data selection unit, the first data allocation unit, the second data selection unit, and the second data allocation unit, thereby using the structure for calculation. Specifically, the calculation process may adopt a bilinear interpolation algorithm or a cubic interpolation method, and the specific calculation process may refer to the above description, which will not be repeated here.

In the technical solution provided by the embodiment of the present application, by constructing a special unit for adjusting the image size in the streaming architecture, and controlling the image data to be calculated to flow through different calculation units in sequence, It avoids calling the CPU for calculation based on the instruction set, realizes the fast calculation of image data, and relieves the calculation pressure of the CPU, thereby realizing the rapid scaling processing of video and image streams, and effectively slowing down the bottleneck problem of the inefficiency of the front and rear processing of the AI chip.

Embodiment 3

FIG. 4 is a flowchart of an image scaling method based on a bilinear interpolation algorithm according to Embodiment 1 of the present application. This embodiment is applicable to the case of performing front-end calculation and processing on video and image stream-related data. This method can be executed by the image scaling device based on bilinear interpolation algorithm provided by the embodiment of the present application. The device can be implemented by hardware and/or software, and generally can be integrated into computer equipment. As shown in FIG. 4, it specifically includes the following steps:

S21. Acquire the first size of the source image and the second size of the target image, and determine a row direction deformation coefficient and a column direction deformation coefficient according to the first size and the second size.

The source image is the original image, and the target image is the desired target image after scaling. When the source image is obtained, its first size can be obtained. When the source image needs to be scaled, the second size of the target image is usually known. If the size matches the subsequent module, after obtaining the first size and the second size, the row direction deformation coefficient and the column direction deformation coefficient can be determined according to the size change of the image.

Optionally, the step of acquiring the first size of the source image and the second size of the target image, and determine a row direction deformation coefficient and a column direction deformation coefficient according to the first size and the second size includes:

$$scale_x = \frac{src_{rows}}{dst_{rows}}$$

-continued $$scale_y = \frac{src_{cols}}{dst_{cols}}$$

where $scale_x$ represents the row direction deformation coefficient, and $scale_y$ represents the column direction deformation coefficient, and $src_{rows}$ represents a width size in the first size, and $dst_{rows}$ represents the width size in the second size, and $src_{cols}$ represents a height size in the first size, and $dst_{cols}$ represents the height size in the second size. Specifically, both the first size and the second size may include the width size (that is, the size of the image in the row direction) and the height size (that is, the size of the image in the column direction). After obtaining the first size and the second size, the row direction deformation coefficient can be calculated through the proportional relationship between the width size of the source image and the width size of the target image, and the column direction deformation coefficient can be calculated through the proportional relationship between the height size of the source image and the height size of the target image.

S22. Input the row direction deformation coefficient and the column direction deformation coefficient into a fixed-point accumulator for accumulation calculation, respectively.

Specifically, after the row direction deformation coefficient and the column direction deformation coefficient are determined, the row direction deformation coefficient and the column direction deformation coefficient can be respectively input into a fixed-point accumulator for accumulation calculation, so as to obtain the result of each accumulation. The accumulation calculation process is a clock-level pipeline calculation, which can greatly improve the bilinear interpolation processing speed when applied to the streaming architecture AI chip.

The bilinear interpolation algorithm can be calculated using the following formula:

$$D_0 = u_1 \times (v_1 \times Q_0 + v_0 \times Q_1) + u_0 \times (v_1 \times Q_2 + v_0 \times Q_3)$$

where $D_0$ represents the calculation result, i.e., the pixel data of the target image, $v_0$ and $v_1$ represent the first image position coefficients, and $u_0$ and $u_1$ represent the second image position coefficients.

The bilinear interpolation algorithm is used in an image size adjustment method, it specifically includes the following steps:

S11. acquiring image data to be calculated and required image position coefficients, where the image position coefficients include a first image position coefficient in the row direction and a second image position coefficient in the column direction;

S12. inputting the image data and the image position coefficient into a corresponding port of the image size adjustment structure according to a preset timing requirement; and S13. controlling the data flowing direction in the image size adjustment structure according to the selected image size adjustment algorithm, and obtaining a scaled calculation result through the image size adjustment structure.

The step of controlling the data flowing direction in the image size adjustment structure according to the selected image size adjustment algorithm, and obtaining a scaled calculation result through the image size adjustment structure.

Optionally, the fixed-point accumulator includes a first accumulator and a second accumulator, and the step of respectively inputting the row direction deformation coefficient and the column direction deformation coefficient into a fixed-point accumulator for accumulation calculation includes: initializing the first input end and the second input end of the first accumulator, and the third input end and the fourth input end of the second accumulator. The output end of the first accumulator is connected to the first input end. The row direction deformation coefficient is input through the second input end. The output end of the second accumulator is connected to the third input end. The column direction deformation coefficient is input through the fourth input end. The first accumulator is controlled to perform the accumulation calculation the first number of times, and the second accumulator is controlled to perform the accumulation calculation the second number of times. The first number of times is the number of pixels of the target image in the row direction, and the second number of times is the number of pixels of the target image in the column direction. Specifically, the process of accumulating the row direction deformation coefficients and the column direction deformation coefficients can be performed simultaneously by using different fixed-point accumulators to improve calculation efficiency, and of course the same fixed-point accumulator can also be used to perform accumulation successively. Specifically, the row direction deformation coefficients can be accumulated through the first accumulator, and the column direction deformation coefficients can be accumulated through the second accumulator. First, the first accumulator and the second accumulator can be initialized. Then the result of the first accumulation of the first accumulator is the row direction deformation coefficient itself, and at the same time, the result of the first accumulation is used as the input of the second accumulation process, and then is added to the row direction deformation coefficient again. Then, the result of the second accumulation is twice the row direction deformation coefficient, and so on, each accumulation result of the first accumulator is a row direction deformation coefficient that increases regularly by an integer multiple, and similarly, each accumulation result of the second accumulator is a column direction deformation coefficient that increases regularly by an integer multiple. At the same time, the number of times of the accumulation of the first accumulator and the second accumulator can be controlled by the positioning number, that is, the first accumulator only performs the accumulation calculation of the first number of times, and the second accumulator only performs the accumulation calculation of the second number of times, so as to control the calculation amount according to the actual need and save the storage space required for the calculation results. The first number of times is the number of pixels of the target image in the row direction, and the second number of times is the number of pixels of the target image in the column direction. Interpolation calculation requirements for all target pixel points in the subsequent target image are thus meet.

S23. Perform a rounding operation on each accumulation result to obtain the integer part and the decimal part of each accumulation result, and use the integer part of each accumulation result of the row direction deformation coefficient as the row fetching address, the decimal part as the row interpolation coefficient, the integer part of each accumulation result of the column direction deformation coefficient is used as the column fetching address, and the decimal part is used as the column interpolation coefficient.

Specifically, after each accumulation result is obtained, the rounding operation can be performed respectively, and the integer part of the accumulation result obtained by accumulating the row direction deformation coefficients can be used as the row fetching address (that is, row coordinates of the pixel point in the source image), the decimal part can be used as the row interpolation coefficient, the integer part of the accumulation result obtained by accumulating the column direction deformation coefficients can be used as the column fetching address (that is, the column coordinates of the pixels in the source image), and the decimal part can be used as the column interpolation coefficient. After determining each row fetching address, row interpolation coefficient, column fetching address and column interpolation coefficient, these data can be stored for future use.

S24. For each target pixel point in the target image, according to the pixel coordinates of the target pixel point, from all the row fetching addresses, the column fetching addresses, the row interpolation coefficients, and the column interpolation coefficients, the corresponding target row fetching address, target column fetching address, target row interpolation coefficient, and target column interpolation coefficient are determined, and the source pixel points required by the corresponding algorithm in the source image are determined according to the target row fetching address and the target column fetching address. Then, based on the bilinear interpolation algorithm, the pixel value of the target pixel point is determined according to the pixel value of the source pixel point, the target row interpolation coefficient and the target column interpolation coefficient.

Specifically, each target pixel point in the target image may be processed separately to obtain the pixel value of each target pixel point corresponding to the source image, thereby obtaining a complete target image. For each target pixel point, the corresponding target row fetching address, target column fetching address, target row interpolation coefficient and target column interpolation coefficient can be selected from the stored row fetching address, row interpolation coefficient, column fetching address, and column interpolation coefficient according to its pixel coordinates. Then, according to the target row fetching address and the target column fetching address, the corresponding source pixel point can be found in the source image, and all the source pixel points required by the algorithm can be determined according to the source pixel point, thereby obtaining the pixel value of each source pixel point. Then based on the bilinear interpolation algorithm, the pixel value of the target pixel point can be obtained by the calculation according to the pixel value of the source pixel point, the target row interpolation coefficient and the target column interpolation coefficient.

Optionally, the rounding operation is rounding down, and the step of according to the target row fetching address and the target column fetching address, determining the source pixel points required by the corresponding algorithm in the source image includes: using the target row fetching address as a row coordinate, using the target column fetching address as a column coordinate to determine the first source pixel point; using the target row fetching address as a row coordinate, and using adding one to the target column fetching address as a column coordinate to determine the second source pixel point; using adding one to the target row fetching address as a row coordinate, and using the target column fetching address as a column coordinate to determine the third source pixel point; and using adding one to the row fetching address as a row coordinate, using adding one to the target column fetching address as a column coordinate to determine the fourth source pixel point. Specifically, when the rounding-down method is adopted, the first source pixel point closest to the coordinate origin is firstly determined according to the target row fetching address and the target column fetching address, and then by respectively adding one to the target row fetching address, adding one to the target column fetching address, and adding one to both the target row fetching address and the target column fetching address to obtain the required second source pixel point, third source pixel point, and fourth source pixel point for subsequent interpolation calculations.

Further optionally, the step of based on the bilinear interpolation algorithm, determining the pixel value of the target pixel point according to the pixel value of the source pixel point, the target row interpolation coefficient, and the target column interpolation coefficient includes:

$$P_{(X_{dst},Y_{dst})}=(1-u_{x1})(1-v_{x1})\times Q_{x11}+(1-u_{x1})\times v_{x1}\times Q_{x12}+ \\ u_{x1}\times(1-v_{x1})\times Q_{x21}+u_{x1}\times v_{x1}\times Q_{x22}$$

where $(X_{dst}, Y_{dst})$ represents the pixel coordinate of the target pixel point, $P_{(X_{dst},Y_{dst})}$ represents the pixel value of the target pixel point, $u_{x1}$ represents the target row interpolation coefficient, and $v_{x1}$ represents the target column interpolation coefficient, and $Q_{x11}$ represents the pixel value of the first source pixel point, $Q_{x12}$ represents the pixel value of the second source pixel point, $Q_{x21}$ represents the pixel value of the third source pixel point, and $Q_{x22}$ represents the pixel value of the fourth source pixel point. Specifically, after the target row interpolation coefficient, the target column interpolation coefficient, and the pixel value of each source pixel point are determined, the pixel values of the corresponding target pixel points can be obtained by calculation through the above formula.

It is further explained that, when applying the bilinear interpolation algorithm, it is necessary to map the target pixel point in the target image back to the source image, and then take 4 adjacent pixels around it for linear interpolation calculation. The interpolation calculation process needs to first obtain the target row interpolation coefficient in the above formula (value is the distance in the row direction between the mapped coordinate point and the first source pixel point), target column interpolation coefficient (value is the distance in the column direction between the mapped coordinate point and the first source pixel point) and the pixel value of each source pixel point. In order to determine the pixel value of the source pixel point, the pixel coordinate of each source pixel point needs to be obtained, the traditional calculation method is as follows:

$$X_{src}=X_{dst}\times scale_x$$

$$Y_{src}=Y_{dst}\times scale_y$$

where $X_{dst}$ represents the row coordinate of the target pixel point, and $X_{src}$ represents the row coordinate of the target pixel point after mapping it back to the source image, and $scale_x$ represents the row direction deformation coefficient, and $Y_{dst}$ represents the column coordinate of the target pixel point, and $Y_{src}$ represents the column coordinate of the target pixel point after mapping it back to the source image, and $scale_y$ represents the column direction deformation coefficient, and then the four adjacent pixel points around it are determined according to $X_{src}$ and $Y_{src}$. In the calculation process, the integer $X_{dst}$ and the decimal $scale_x$ are multiplied, and $scale_x$ is obtained by dividing $src_{rows}$ by $dst_{rows}$. Therefore, the calculation of $X_{src}$ involves one multiplication and one division operation, and for the same principle, calculating $Y_{src}$ is similar. And $scale_x$ and $scale_y$ are fixed decimals, which can be obtained by calculation as long as the sizes of the source and target images are determined, and will not change during the calculation of other data of the whole image. At the same time, $X_{dst}$ and $Y_{dst}$ are regular increasing integers, that is, 0, 1, 2, . . . increasing. Therefore, the above formula can be converted into an accumulation calculation process. Through continuous accumulation calculations, the integer part of the result obtained is the coordinate of the first source pixel point, and the decimal part is the row interpolation coefficient and the column interpolation coefficient. When applying the method provided in this embodiment, after changing the image scaling ratio each time and before completing the interpolation calculation, it is only necessary to recalculate the row direction deformation coefficient and the column direction deformation coefficient one time, and the subsequent calculation of the fetching address and the interpolation coefficient can be realized by accumulation, and then the multiplication and addition operation of the bilinear interpolation is performed, thereby greatly reducing the multiplication and division operations.

On the basis of the above technical solution, optionally, before according to the pixel coordinates of the target pixel point, from all the row fetching addresses, the column fetching addresses, the row interpolation coefficients and the column interpolation, determining the corresponding target row fetching address, target column fetching address, target row interpolation coefficient and target column interpolation coefficient, it further includes: sequentially storing the integer part and the decimal part of each accumulation result of the row direction deformation coefficient into the first lookup table, sequentially storing the integer part and the decimal part of each accumulation result of the column direction deformation coefficient into the second lookup table, and the index values of the first lookup table and the second lookup table respectively correspond to the row coordinates and column coordinates of each of the target pixel points. Correspondingly, according to the pixel coordinates of the target pixel point, from all the row fetching addresses, the column fetching addresses, the row interpolation coefficients and the column interpolation, determining the corresponding target row fetching address, target column fetching address, target row interpolation coefficient and target column interpolation coefficient includes: respectively using the row coordinates and column coordinates in the pixel coordinates as index values to look up the target row fetching address, the target column fetching address, the target row interpolation coefficient, and the target column interpolation coefficient from the first lookup table and the second lookup table.

Specifically, in order to facilitate each target pixel point to look up the corresponding required target row fetching address, target column fetching address, target row interpolation coefficient, and target column interpolation coefficient, the integer part and the decimal part of each accumulation result of the row direction deformation coefficient can be sequentially stored in the first lookup table in advance, and the integer part and the decimal part of each accumulation result of the column direction deformation coefficient can be sequentially stored in the second lookup table in advance. The index values of the first lookup table and the second lookup table can be an orderly increasing integer starting from 0, that is, 0, 1, 2, . . . increasing to correspond to the row coordinates and column coordinates of the target pixel point respectively, so that when it is necessary to calculate the pixel value in the target image, the row coordinates and column coordinates of the target pixel point can be firstly directly used as index values to look up the corresponding required fetching addresses and interpolation coefficients in the first lookup table and the second lookup table respectively. When applying the method provided in this embodiment, after changing the image scaling ratio each time and before completing the interpolation calculation, it is only necessary to calculate the content of the lookup table once, and then it can be directly looked up and used later. Further optionally, the second size includes a width size and a height size; before the integer part and decimal part of each accumulation result of the row direction deformation coefficient are sequentially stored in the first lookup table, the integer part and decimal part of each accumulation result of the column direction deformation coefficient are sequentially stored in the second lookup table, it further includes: respectively allocating a lookup table space for the first lookup table and the second lookup table, the lookup table space width of the first lookup table is 2, and the depth is the width size, and the lookup table space width of the second lookup table is 2, and the depth is the height size. Specifically, each index value in the lookup table corresponds to a fetching address and an interpolation coefficient, and the number of fetching addresses and interpolation coefficients that need to be calculated in advance can be determined according to the second size of the target image, as the lookup table depth, so as to set the lookup table space according to actual needs.

In the technical solution provided by the embodiment of the present application, the first size of the source image and the second size of the target image are obtained first, and the row direction deformation coefficient and the column direction deformation coefficient are determined according to the first size and the second size. Then, the row direction deformation coefficient and the column direction deformation coefficient are input into the fixed-point accumulator for accumulation calculation, and each accumulation result is rounded to determine the fetching addresses and interpolation coefficients of the pixel points in the source image according to the integer part and decimal part obtained after rounding. Then, for each target pixel point in the target image, the corresponding target fetching address and target interpolation coefficient are determined according to the pixel coordinate of the target pixel point, and the source pixel point in the source image required by the corresponding algorithm is determined according to the target fetching address, so that based on the bilinear interpolation algorithm, the pixel value of the target pixel point is determined according to the pixel value of the source pixel point and the target interpolation coefficient. By constructing a special unit for bilinear interpolation in the streaming architecture, the original multiplication and division operations are converted into accumulation operations, which greatly reduces the multiplication and division operations applied in the image scaling process, thereby realizing extremely high-efficiency calculations and relieves the calculation pressure of the CPU.

In the traditional calculation architecture, it is necessary to use the CPU to perform the bilinear interpolation function of the image based on the instruction set. When performing the interpolation calculation, it is divided into coefficient generation, data extraction, coefficient and data multiplication and addition operations, etc. Because the data amount of the operation is large, and a part of the process involves division operations, this leads to a large consumption of system resources and operation time costs, thereby affecting the overall calculation efficiency. The method of Embodiment 3 is applied to greatly reduce multiplication and division operations, thereby realize extremely high-efficiency calculations and relieve the calculation pressure of the CPU. Specifically, by constructing a special unit for bilinear interpolation in the streaming architecture, the original multiplication and division operations are converted into accumulation operations, which greatly reduces multiplication and division operations applied during image scaling.

Embodiment 4

Figure 5:
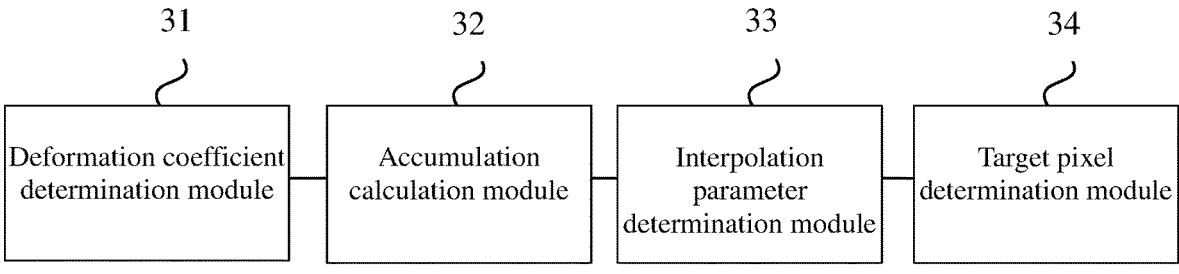
FIG. 5 is a schematic structural diagram of an image scaling device based on a bilinear interpolation algorithm provided in Embodiment 4 of the present application.

FIG. 5 is a schematic structural diagram of an image scaling device based on a bilinear interpolation algorithm provided in Embodiment 2 of the present application. The device can be realized by hardware and/or software, and generally can be integrated into a computer device to execute an image scaling method based on a bilinear interpolation algorithm provided by any embodiment of the present application. As shown in FIG. 5, the device includes:

a deformation coefficient determination module 31, configured to obtain the first size of the source image and the second size of the target image, and determine the row direction deformation coefficient and the column direction deformation coefficient according to the first size and the second size;

an accumulation calculation module 32, configured to respectively input the row direction deformation coefficient and the column direction deformation coefficient into a fixed-point accumulator for accumulation calculation;

an interpolation parameter determination module 33, configured to perform a rounding operation on each accumulation result to obtain an integer part and a decimal part of each accumulation result, and use the integer part of each accumulation result of the row direction deformation coefficient as a row fetching address, the decimal part thereof as a row interpolation coefficient, the integer part of each accumulation result of the column direction deformation coefficient as the column fetching address, and the decimal part thereof as the column interpolation coefficient;

a target pixel determination module 34, configured to for each target pixel point in the target image, according to the pixel coordinates of the target pixel point, from all the row fetching addresses, the column fetching addresses, the row interpolation coefficient, and the column interpolation coefficient, determine the corresponding target row fetching address, target column fetching address, target row interpolation coefficient, and target column interpolation coefficient, and according to the target row fetching address and the target column fetching address, determine the source pixel points in the source image required by the corresponding algorithm, and then based on the bilinear interpolation algorithm, determine the pixel value of the target pixel point according to the pixel value of the source pixel point, the target row interpolation coefficient and the target column interpolation coefficient.

The bilinear interpolation algorithm can be calculated using the following formula:

$$D_0 = u_1 \times (v_1 \times Q_0 + v_0 \times Q_1) + u_0 \times (v_1 \times Q_2 + v_0 \times Q_3)$$

where $D_0$ represents the calculation result, i.e., the pixel data of the target image, $v_0$ and $v_1$ represent the first image position coefficients, and $u_0$ and $u_1$ represent the second image position coefficients.

The bilinear interpolation algorithm is used in an image size adjustment method, it specifically includes the following steps:

S11. acquiring image data to be calculated and required image position coefficients, where the image position coefficients include a first image position coefficient in the row direction and a second image position coefficient in the column direction;

S12. inputting the image data and the image position coefficient into a corresponding port of the image size adjustment structure according to a preset timing requirement; and S13. controlling the data flowing direction in the image size adjustment structure according to the selected image size adjustment algorithm, and obtaining a scaled calculation result through the image size adjustment structure.

The step of controlling the data flowing direction in the image size adjustment structure according to the selected image size adjustment algorithm, and obtaining a scaled calculation result through the image size adjustment structure.

In the technical solution provided by the embodiment of the present application, the first size of the source image and the second size of the target image are obtained first, and the row direction deformation coefficient and the column direction deformation coefficient are determined according to the first size and the second size. Then, the row direction deformation coefficient and the column direction deformation coefficient are input into the fixed-point accumulator for accumulation calculation, and each accumulation result is rounded to determine the fetching addresses and interpolation coefficients of the pixel points in the source image according to the integer part and decimal part obtained after rounding. Then, for each target pixel point in the target image, the corresponding target fetching address and target interpolation coefficient are determined according to the pixel coordinate of the target pixel point, and the source pixel point in the source image required by the corresponding algorithm is determined according to the target fetching address, so that based on the bilinear interpolation algorithm, the pixel value of the target pixel point is determined according to the pixel value of the source pixel point and the target interpolation coefficient. By constructing a special unit for bilinear interpolation in the streaming architecture, the original multiplication and division operations are converted into accumulation operations, which greatly reduces the multiplication and division operations applied in the image scaling process, thereby realizing extremely high-efficiency calculations and relieves the calculation pressure of the CPU.

On the basis of the above technical solution, optionally, the image scaling device based on a bilinear interpolation algorithm further includes:

an accumulation result storage module, configured to before according to the pixel coordinates of the target pixel point, from all the row fetching addresses, the column fetching addresses, the row interpolation coefficients and the column interpolation, determining the corresponding target row fetching address, target column fetching address, target row interpolation coefficient and target column interpolation coefficient, sequentially store the integer part and the decimal part of each accumulation result of the row direction deformation coefficient into the first lookup table, sequentially store the integer part and the decimal part of each accumulation result of the column direction deformation coefficient into the second lookup table, and the index values of the first lookup table and the second lookup table respectively correspond to the row coordinates and column coordinates of each of the target pixel points. Correspondingly, the target pixel determination module 34 includes:

a target parameter lookup unit, configured to use row coordinates and column coordinates in the pixel coordinates as index values to look up the target row fetching address, the target column fetching address, the target row interpolation coefficient and the target column interpolation coefficient.

On the basis of the above technical solution, optionally, the second size includes a width size and a height size; the image scaling device based on a bilinear interpolation algorithm further includes:

a lookup table space allocation module, configured to before the integer part and decimal part of each accumulation result of the row direction deformation coefficient are sequentially stored in the first lookup table, the integer part and decimal part of each accumulation result of the column direction deformation coefficient are sequentially stored in the second lookup table, respectively allocate a lookup table space for the first lookup table and the second lookup table, the lookup table space width of the first lookup table is 2, and the depth is the width size, and the lookup table space width of the second lookup table is 2, and the depth is the height size.

On the basis of the above technical solution, optionally, the rounding operation is rounding down, and the target pixel determination module 34 includes:

a source pixel determination unit, configured to use the target row fetching address as a row coordinate, and use the target column fetching address as a column coordinate to determine the first source pixel point, use the target row fetching address as a row coordinate, and use adding one to the target column fetching address as a column coordinate to determine the second source pixel point; use adding one to the target row fetching address as a row coordinate, and use the target column fetching address as a column coordinate to determine the third source pixel point; and use adding one to the row fetching address as a row coordinate, and use adding one to the target column fetching address as a column coordinate to determine the fourth source pixel point.

On the basis of the above technical solution, optionally, the target pixel determination module 34 is specifically used for:

$$P_{(X_{dst},Y_{dst})}=(1-u_{x1})(1-v_{x1})\times Q_{x11}+(1-u_{x1})\times v_{x1}\times Q_{x12}+u_{x1}\times(1-v_{x1})\times Q_{x21}+u_{x1}\times v_{x1}\times Q_{x22}$$

where $(X_{dst}, Y_{dst})$ represents the pixel coordinate of the target pixel point, $P_{(X_{dst},Y_{dst})}$ represents the pixel value of the target pixel point, $u_{x1}$ represents the target row interpolation coefficient, and $v_{x1}$ represents the target column interpolation coefficient, and $Q_{x11}$ represents the pixel value of the first source pixel point, $Q_{x12}$ represents the pixel value of the second source pixel point, $Q_{x21}$ represents the pixel value of the third source pixel point, and $Q_{x22}$ represents the pixel value of the fourth source pixel point.

On the basis of the above technical solution, optionally, the deformation coefficient determining module 31 is specifically used for:

$$scale_x = \frac{src_{rows}}{dst_{rows}}$$

$$scale_y = \frac{src_{cols}}{dst_{cols}}$$

where $scale_x$ represents the row direction deformation coefficient, and $scale_y$ represents the column direction deformation coefficient, and $src_{rows}$ represents a width size in the first size, and $dst_{rows}$ represents the width size in the second size, and $src_{cols}$ represents a height size in the first size, and $dst_{cols}$ represents the height size in the second size.

On the basis of the above technical solution, optionally, the accumulation calculation module 32 includes:

an initialization unit, configured to initialize the first input end and the second input end of the first accumulator, and the third input end and the fourth input end of the second accumulator;

the output end of the first accumulator is connected to the first input end. The row direction deformation coefficient is input through the second input end, the output end of the second accumulator is connected to the third input end, and the column direction deformation coefficient is input through the fourth input end; and an accumulation control unit, configured to control the first accumulator to perform the accumulation calculation the first number of times, and control the second accumulator to perform the accumulation calculation the second number of times, wherein the first number of times is the number of pixels of the target image in the row direction, and the second number of times is the number of pixels of the target image in the column direction.

The image scaling device based on the bilinear interpolation algorithm provided by the embodiment of the present application can execute the image scaling method based on the bilinear interpolation algorithm provided by any embodiment of the present application, and has corresponding functional modules and beneficial effects for executing the method.

It should be noted that in the image scaling device based on the bilinear interpolation algorithm in the above embodiment, the included units and modules are only divided according to functional logic, but are not limited to the above division, as long as the corresponding functions can be realized. In addition, the specific names of each functional unit are only for the convenience of distinguishing them from each other, and are not used to limit the protection scope of the present application.

Embodiment 5

Figure 6:
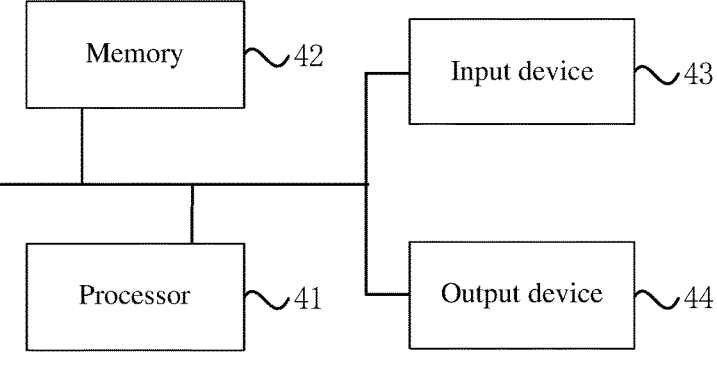
FIG. 6 is a schematic structural diagram of a computer device provided by Embodiment 5 of the present application.

FIG. 6 is a schematic structural diagram of a computer equipment provided by Embodiment 5 of the present application, showing a block diagram of an exemplary computer device suitable for implementing the embodiments of the present application. The computer equipment shown in FIG. 6 is only an example, and should not limit the functions and scope of use of the embodiments of the present application. As shown in FIG. 6, the computer equipment includes a processor 41, a memory 42, an input device 43 and an output device 44. The number of processors 41 in the computer equipment can be one or more, and one processor 41 is taken as an example in FIG. 4, the processor 41, the memory 42, the input device 43 and the output device 44 in the computer equipment can be connected through a bus or in other ways. In FIG. 6, the connection through a bus is taken as an example.

The memory 42, as a computer-readable storage medium, can be used to store software programs, computer-executable programs and modules, such as program instructions/modules corresponding to the image size adjustment method in the embodiment of the present application. The processor 41 executes various functional applications and data processing of the computer equipment by running software programs, instructions and modules stored in memory 42, that is, realizes the above-mentioned image size adjustment method, and realizes the above-mentioned image scaling method based on the bilinear interpolation-based algorithm.

The memory 42 may mainly include a program storage area and a data storage area. The program storage area may store an operating system and at least one application program required by a function; and the data storage area may store data created according to the use of the computer equipment, and the like. In addition, the memory 42 may include a high-speed random access memory, and may also include a non-volatile memory, such as at least one magnetic disk storage device, flash memory device, or other non-volatile solid-state storage devices. In some examples, the memory 42 may further include memories located remotely relative to the processor 41, and these remote memories may be connected to the computer equipment through a network. Examples of the aforementioned network include, but are not limited to, the Internet, intranets, local area networks, mobile communication networks, and combinations thereof.

The input device 43 can be used to obtain image data to be calculated and required image position coefficients, and generate key signal inputs related to user settings and function control of the computer equipment. The output device 44 can be used to transmit calculation results etc. to subsequent modules. Of course, the input device 43 can also be used to obtain the first size of the source image and the second size of the target image, and generate key signal inputs related to user settings and function control of the computer equipment. The output device 44 can be used to transmit calculation results etc. to subsequent modules.

Embodiment 6

Embodiment 6 of the present application also provides a storage medium containing computer-executable instructions, and the computer-executable instructions are used to perform an image size adjustment method when executed by a computer processor, the method including:

acquiring image data to be calculated and required image position coefficients, where the image position coefficients include a first image position coefficient in the row direction and a second image position coefficient in the column direction;

inputting the image data and the image position coefficient into a corresponding port of the image size adjustment structure according to a preset timing requirement; and controlling the data flowing direction in the image size adjustment structure according to the selected image size adjustment algorithm, and obtaining a scaled calculation result through the image size adjustment structure.

Embodiment 7

Embodiment 7 of the present application also provides a storage medium containing computer-executable instructions, the computer-executable instructions are used to execute an image scaling method based on a bilinear interpolation algorithm when executed by a computer processor, and the method includes:

acquiring the first size of the source image and the second size of the target image, and determining a row direction deformation coefficient and a column direction deformation coefficient according to the first size and the second size;

respectively inputting the row direction deformation coefficient and the column direction deformation coefficient into a fixed-point accumulator for accumulation calculation;

performing a rounding operation on each accumulation result to obtain the integer part and the decimal part of each accumulation result, using the integer part of each accumulation result of the row direction deformation coefficient as the row fetching address and the decimal part as the row interpolation coefficient, and using the integer part of each accumulation result of the column direction deformation coefficient as the column fetching address and the decimal part as the column interpolation coefficient; and for each target pixel point in the target image, according to the pixel coordinates of the target pixel point, from all the row fetching addresses, the column fetching addresses, the row interpolation coefficients, and the column interpolation coefficients, determining the corresponding target row fetching address, target column fetching address, target row interpolation coefficient, and target column interpolation coefficient, and determining the source pixel points required by the corresponding algorithm in the source image according to the target row fetching address and the target column fetching address, and then, based on the bilinear interpolation algorithm, determining the pixel value of the target pixel point according to the pixel value of the source pixel point, the target row interpolation coefficient and the target column interpolation coefficient.

The storage medium may be any of various types of memory devices or storage devices. The term "storage medium" is intended to include: installation media such as CD-ROMs, floppy disks, or tape drives; computer system memory or random access memory such as DRAM, DDR RAM, SRAM, EDO RAM, Rambus RAM, etc.; non-volatile memory such as flash memory, magnetic media (e.g. hard disk or optical storage); registers or other similar types of memory elements, etc. The storage medium may also include other types of memory or combinations thereof. In addition, the storage medium may be located in a computer system in which the program is executed, or may be located in a different second computer system connected to the computer system through a network such as the Internet. The second computer system may provide program instructions to the computer for execution. The term "storage medium" may include two or more storage media that may reside in different locations (such as in different computer systems connected by a network). The storage medium may store program instructions (e.g., embodied as computer programs) executable by one or more processors.

Certainly, in a storage medium containing computer-executable instructions provided in an embodiment of the present application, the computer-executable instructions are not limited to the method operations described above, and may also perform related operations of the image size adjustment method provided in any embodiment of the present application.

A computer readable signal medium may include a data signal carrying computer readable program code propagated in baseband or as a part of a carrier wave. Such propagated data signals may take many forms, including but not limited to electromagnetic signals, optical signals, or any suitable combination of the foregoing. A computer-readable signal medium may also be any computer-readable medium other than a computer-readable storage medium, which can send, propagate, or transmit a program for use by or in conjunction with an instruction execution system, apparatus, or device.

Program code contained in a computer readable medium may be transmitted using any appropriate medium, including but not limited to wireless, wireline, optical fiber cable, RF, etc., or any suitable combination of the foregoing.

Through the above description about the embodiments, those skilled in the art can clearly understand that the present application can be realized by means of software and necessary general-purpose hardware, and of course it can also be realized by hardware, but in many cases the former is a better implementation mode. Based on this understanding, the essence of the technical solution of the present application or the part that contributes to the prior art can be embodied in the form of a software product, and the computer software product can be stored in a computer-readable storage medium, such as a floppy disk of a computer, read-only memory (ROM), random access memory (RAM), flash memory (FLASH), hard disk or optical disc, etc., including several instructions to make a computer equipment (which can be a personal computer, server, or network device, etc.) execute the method described in each embodiment of the present application.

It is noted that the above are only preferred embodiments of the present application and applied technical principles. Those skilled in the art will understand that the present application is not limited to the specific embodiments described herein, and that various obvious changes, readjustments and substitutions can be made by those skilled in the art without departing from the protection scope of the present application. Therefore, although the present application has been described in detail through the above embodiments, the present application is not limited to the above embodiments, and can also include more other equivalent embodiments without departing from the concept of the present application, and the scope of the present application is determined by the scope of the appended claims.

What is claimed is:

1. An image size adjustment structure based on a streaming architecture, comprising:

a first multiplier, a second multiplier, a first data register, a second data register, a first adder and a second adder;

wherein, a first input port of the first multiplier is used to receive image data to be calculated, a second input port of the first multiplier is used to receive a first image position coefficient, and an output port of the first multiplier is respectively connected to an input port of the first data register and a third input port of the first adder, an output port of the first data register is connected to a fourth input port of the first adder, an output port of the first adder is connected to a fifth input port of the second multiplier, a sixth input port of the second multiplier is used to receive a second image position coefficient, and an output port of the second multiplier is respectively connected to an input port of the second data register and a seventh input port of the second adder, an output port of the second data register is connected to an eighth input port of the second adder, an output port of the second adder is used to output a calculation result of the image data;

the first data register is used to store a previous operation result of the first multiplier in a serial operation, and the second data register is used to store a previous operation result of the second multiplier in the serial operation.

2. The image size adjustment structure based on the streaming architecture according to claim 1, further comprising:

a first data selector and a first data distributor between the first adder and the second multiplier, a third data register and a third adder between the first data selector and the first data distributor;

wherein, the output port of the first adder is connected to an input port of the first data selector, an output port of the first data distributor is connected to the input port of the second multiplier, a first output port of the first data selector is directly connected to a ninth input port of the first data distributor, a tenth input port of the first data distributor is connected to an output port of the third adder, a second output port of the first data selector is respectively connected to an input port of the third data register and an eleventh input port of the third adder, an output of the third data register is connected to a twelfth input port of the third adder;

after the second adder, the structure further comprises a second data selector and a second data distributor, and between the second data selector and the second data distributor, the structure further comprises a fourth data register and a fourth adder;

wherein, the output port of the second adder is connected to an input port of the second data selector, an output port of the second data distributor is used to output the calculation result of the image data, a third output port of the second data selector is directly connected to a thirteenth input port of the second data distributor, a fourteenth input port of the second data distributor is connected to an output port of the fourth adder, a fourth output port of the second data selector is respectively connected to an input port of the fourth data register and a fifteenth input port of the fourth adder, and an output port of the fourth data register is connected to a sixteenth input port of the fourth adder.

3. The image size adjustment structure based on the streaming architecture according to claim 2, wherein when the first data selector and the first data distributor select to use a data flowing direction from the first output port to the ninth input port, and the second data selector and the second data distributor select to use a data flowing direction from the third output port to the thirteenth input port, the image size adjustment structure adopts a bilinear interpolation algorithm.

4. The image size adjustment structure based on the streaming architecture according to claim 2, wherein when the first data selector and the first data distributor select to use a data flowing direction from the second output port to the tenth input port, and the second data selector and the second data distributor select to use a data flowing direction from the fourth output port to the fourteenth input port, the image size adjustment structure adopts a cubic interpolation method.

5. An image size adjustment method, applied to the image size adjustment structure based on the streaming architecture according to claim 2, comprising:

acquiring image data to be calculated and required image position coefficients, the image position coefficients comprising a first image position coefficient in a row direction and a second image position coefficient in a column direction;

inputting the image data and the image position coefficients into a corresponding port of the image size adjustment structure according to a preset timing requirement; and controlling a data flowing direction in the image size adjustment structure according to a selected image size adjustment algorithm, and obtaining a scaled calculation result through the image size adjustment structure.

6. The image size adjustment method according to claim 5, wherein the step of controlling a data flowing direction in the image size adjustment structure according to a selected image size adjustment algorithm, and obtaining a scaled calculation result through the image size adjustment structure comprises:

when the image size adjustment algorithm is a bilinear interpolation algorithm, a following formula is used for calculation:

$$D_0 = u_1 \times (v_1 \times Q_0 + v_0 \times Q_1) + u_0 \times (v_1 \times Q_2 + v_0 \times Q_3)$$

where $D_0$ represents pixel data of a target image, $v_0$ and $v_1$ represent the first image position coefficient, and $u_0$ and $u_1$ represent the second image position coefficient, and $Q_0$, $Q_1$, $Q_2$ and $Q_3$ represent 4 pixel data in a source image.

7. The image size adjustment method according to claim 5, the step of controlling a data flowing direction in the image size adjustment structure according to a selected image size adjustment algorithm, and obtaining a scaled calculation result through the image size adjustment structure comprises:

when the image size adjustment algorithm is a cubic interpolation method, a following formula is used for calculation:

$$D_0 = u_0 \times (v_0 \times Q_0 + v_1 \times Q_1 + v_2 \times Q_2 + v_3 \times Q_3) + u_1 \times (v_0 \times Q_4 + v_1 \times Q_5 + v_2 \times Q_6 + v_3 \times Q_7) + u_2 \times (v_0 \times Q_8 + v_1 \times Q_9 + v_2 \times Q_{10} + v_3 \times Q_{11}) + u_3 \times (v_0 \times Q_{12} + v_1 \times Q_{13} + v_2 \times Q_{14} + v_3 \times Q_{15})$$

where $D_0$ represents pixel data of a target image, $v_0$, $v_1$, $v_2$ and $v_3$ represent the first image position coefficient, $u_0$, $u_1$, $u_2$ and $u_3$ represent the second image position coefficient, and $Q_0$, $Q_1$, $Q_2$, $Q_3$, $Q_4$, $Q_5$, $Q_6$, $Q_7$, $Q_8$, $Q_9$, $Q_{10}$, $Q_{11}$, $Q_{12}$, $Q_{13}$, $Q_{14}$ and $Q_{15}$ represent 16 pixel data in a source image.

8. The image size adjustment method according to claim 5, wherein acquiring the required image position coefficients comprises:

calculating the image position coefficients according to a preset image scaling ratio and the image size adjustment algorithm through a pre-stage module.

9. An image scaling method based on a bilinear interpolation algorithm, applied to the image size adjustment method according to claim 6, comprising:

acquiring a first size of a source image and a second size of a target image, and determining a row direction deformation coefficient and a column direction defor-
mation coefficient according to the first size and the
second size;

respectively inputting the row direction deformation coef-
ficient and the column direction deformation coefficient
into a fixed-point accumulator for accumulation calcu-
lation;

respectively performing a rounding operation on each
accumulation result to obtain an integer part and a
decimal part of each accumulation result, and using the
integer part of each accumulation result of the row
direction deformation coefficient as a row fetching
address, and the decimal part of each accumulation
result of the row direction deformation coefficient as a
row interpolation coefficient, using the integer part of
each accumulation result of the column direction defor-
mation coefficient as a column fetching address, and the
decimal part of each accumulation result of the column
direction deformation coefficient as a column interpo-
lation coefficient; and for each target pixel point in the target image, according
to a pixel coordinate of the target pixel point, from all
row fetching addresses, all column fetching addresses,
all row interpolation coefficients, and all column inter-
polation coefficients, determining a corresponding tar-
get row fetching address, a corresponding target col-
umn fetching address, a corresponding target row
interpolation coefficient, and a corresponding target
column interpolation coefficient, and determining a
source pixel point in the source image required by a
corresponding algorithm according to the target row
fetching address and the target column fetching
address; and then based on the bilinear interpolation
algorithm, determining a pixel value of the target pixel
point according to a pixel value of the source pixel
point, the target row interpolation coefficient and the
target column interpolation coefficient.

10. The image scaling method based on the bilinear
interpolation algorithm according to claim 9, before the step of according to a pixel coordinate of the
target pixel point, from all row fetching addresses, all
column fetching addresses, all row interpolation coef-
ficients, and all column interpolation coefficients, deter-
mining a corresponding target row fetching address, a
corresponding target column fetching address, a corre-
sponding target row interpolation coefficient, and a
corresponding target column interpolation coefficient,
and determining a source pixel point in the source
image required by a corresponding algorithm according
to the target row fetching address and the target column
fetching address, further comprising:

storing the integer part and the decimal part of each
accumulation result of the row direction deformation
coefficient into a first lookup table in sequence, and
storing the integer part and the decimal part of each
accumulation result of the column direction deforma-
tion coefficient into a second lookup table in sequence,
index values of the first lookup table and the second
lookup table respectively corresponding to row coor-
dinates and column coordinates of each target pixel
point;

correspondingly, the step of according to a pixel coordi-
nate of the target pixel point, from all row fetching
addresses, all column fetching addresses, all row inter-
polation coefficients, and all column interpolation coef-
ficients, determining a corresponding target row fetch-
ing address, a corresponding target column fetching address, a corresponding target row interpolation coef-
ficient, and a corresponding target column interpolation
coefficient comprising:

respectively using row coordinates and column coordi-
nates in the pixel coordinate as the index values to look
up the target row fetching address, the target column
fetching address, the target row interpolation coeffi-
cient and the target column interpolation coefficient
from the first lookup table and the second lookup table.

11. The image scaling method based on the bilinear
interpolation algorithm according to claim 10, wherein, the second size includes a width size and a height size;

before the step of storing the integer part and the
decimal part of each accumulation result of the row
direction deformation coefficient into a first lookup
table in sequence, and storing the integer part and the
decimal part of each accumulation result of the column
direction deformation coefficient into a second lookup
table in sequence, the method further comprises:

allocating a lookup table space for the first lookup table
and the second lookup table respectively, a width of a
lookup table space of the first lookup table is 2, and a
depth of the lookup table space of the first lookup table
is the width size, a width of a lookup table space of the
second lookup table is 2, and a depth of the lookup table
space of the second lookup table is the height size.

12. The image scaling method based on the bilinear
interpolation algorithm according to claim 9, wherein the
rounding operation is rounding down, and the step of
determining a source pixel point in the source image
required by a corresponding algorithm according to the
target row fetching address and the target column fetching
address comprises:

using the target row fetching address as a row coordinate,
and the target column fetching address as a column
coordinate to determine a first source pixel point;

using the target row fetching address as a row coordinate,
adding one to the target column fetching address as a
column coordinate to determine a second source pixel
point;

using adding one to the target row fetching address as a
row coordinate, and the target column fetching address
as a column coordinate to determine a third source
pixel point; and using adding one to the target row fetching address as a
row coordinate, adding one to the target column fetch-
ing address as a column coordinate to determine a
fourth source pixel.

13. The image scaling method based on the bilinear
interpolation algorithm according to claim 12, wherein,
based on the bilinear interpolation algorithm, the step of
determining a pixel value of the target pixel point according
to a pixel value of the source pixel point, the target row
interpolation coefficient and the target column interpolation
coefficient comprises:

$$P_{(X_{dst},Y_{dst})}=(1-u_{x1})(1-v_{x1})\times Q_{x11}+(1-u_{x1})\times v_{x1}\times Q_{x12}+ u_{x1}\times(1-v_{x1})\times Q_{x21}+u_{x1}\times v_{x1}\times Q_{x22}$$

where $(X_{dst}, Y_{dst})$ represents the pixel coordinate of the
target pixel point, $P_{(X_{dst},Y_{dst})}$ represents the pixel value of
the target pixel point, $u_{x1}$ represents the target row
interpolation coefficient, and $v_{x1}$ represents the target
column interpolation coefficient, $Q_{x11}$ represents the
pixel value of the first source pixel point, $Q_{x12}$ repre-
sents the pixel value of the second source pixel point, $Q_{x21}$ represents the pixel value of the third source pixel point, and $Q_{x22}$ represents the pixel value of the fourth source pixel point.

14. The image scaling method based on the bilinear interpolation algorithm according to claim 9, wherein the step of acquiring a first size of a source image and a second size of a target image, and determining a row direction deformation coefficient and a column direction deformation coefficient according to the first size and the second size comprises:

$$\text{scale}_x = \frac{src_{rows}}{dst_{rows}} \quad \text{scale}_y = \frac{src_{cols}}{dst_{cols}}$$

where $\text{scale}_x$ represents the row direction deformation coefficient, $\text{scale}_y$ represents the column direction deformation coefficient, $src_{rows}$ represents a width size in the first size, and $dst_{rows}$ represents a width size in the second size, $src_{cols}$ represents a height size in the first size, and $dst_{cols}$ represents a height size in the second size.

15. The image scaling method based on the bilinear interpolation algorithm according to claim 9, wherein the fixed-point accumulator comprises a first accumulator and a second accumulator, and the step of respectively inputting the row direction deformation coefficient and the column direction deformation coefficient into a fixed-point accumulator for accumulation calculation comprises:

initializing a first input port and a second input port of the first accumulator, and a third input port and a fourth input port of the second accumulator;

an output port of the first accumulator is connected to the first input port, the row direction deformation coefficient is input through the second input port, an output port of the second accumulator is connected to the third input port, the column direction deformation coefficient is input through the fourth input port;

controlling the first accumulator to perform the accumulation calculation a first number of times, and controlling the second accumulator to perform the accumulation calculation a second number of times, wherein the first number of times is the number of pixels of the target image in the row direction, the second number of times is the number of pixels of the target image in the column direction.

16. An image scaling device based on a bilinear interpolation algorithm, applied to the image size adjustment method according to claim 6, comprising:

a deformation coefficient determination module, configured to acquire a first size of a source image and a second size of a target image, and determine a row direction deformation coefficient and a column direction deformation coefficient according to the first size and the second size;

an accumulation calculation module, configured to respectively input the row direction deformation coefficient and the column direction deformation coefficient into a fixed-point accumulator for accumulation calculation;

an interpolation parameter determination module, configured to respectively perform a rounding operation on each accumulation result to obtain an integer part and a decimal part of each accumulation result, and use the integer part of each accumulation result of the row direction deformation coefficient as a row fetching address, and the decimal part of each accumulation result of the row direction deformation coefficient as a row interpolation coefficient, and use the integer part of each accumulation result of the column direction deformation coefficient as a column fetching address, and the decimal part of each accumulation result of the column direction deformation coefficient as a column interpolation coefficient; and a target pixel determination module, configured to for each target pixel point in the target image, according to a pixel coordinate of the target pixel point, from all row fetching addresses, all column fetching addresses, all row interpolation coefficients, and all column interpolation coefficients, determine a corresponding target row fetching address, a corresponding target column fetching address, a corresponding target row interpolation coefficient, and a corresponding target column interpolation coefficient, and determine a source pixel point in the source image required by a corresponding algorithm according to the target row fetching address and the target column fetching address; and then based on the bilinear interpolation algorithm, determine a pixel value of the target pixel point according to a pixel value of the source pixel point, the target row interpolation coefficient and the target column interpolation coefficient.

\* \* \* \* \*